United States Patent

Oohara et al.

[11] Patent Number: 5,609,448
[45] Date of Patent: Mar. 11, 1997

[54] APPARATUS FOR MANUFACTURING PLATE FOR GRAVURE

[75] Inventors: Setsuo Oohara; Tadashi Shudo, both of Kyoto, Japan

[73] Assignee: Dainippon Screen Mfg. Co., Ltd., Kyoto, Japan

[21] Appl. No.: 627,314

[22] Filed: Apr. 3, 1996

[30] Foreign Application Priority Data

Apr. 4, 1995 [JP] Japan ..................................... 7-104686

[51] Int. Cl.⁶ ................................. B23C 3/04; H04N 1/24; G01D 15/00
[52] U.S. Cl. ........................ 409/80; 101/463.1; 358/299; 409/165
[58] Field of Search ............................. 409/134, 80, 165, 409/96, 93, 199, 204, 901; 358/299, 297, 298; 219/121.68; 101/463.1, 128.4

[56] References Cited

U.S. PATENT DOCUMENTS

| | | | |
|---|---|---|---|
| 3,739,088 | 6/1973 | Landsman | 358/297 |
| 3,784,739 | 1/1974 | De Vos et al. | 358/299 X |
| 4,450,486 | 5/1984 | Buechler | 358/299 |
| 4,500,929 | 2/1985 | Buechler | 358/299 |
| 5,112,171 | 5/1992 | Daetwyler | 409/199 X |
| 5,424,845 | 6/1995 | Holowko et al. | 409/204 X |
| 5,424,846 | 6/1995 | Bornhorst, Jr. et al. | 409/132 X |

Primary Examiner—William R. Briggs
Attorney, Agent, or Firm—Lowe, Price, LeBlanc & Becker

[57] ABSTRACT

An uninterruptive power supply is connected to an engraving apparatus. When power failure occurs, with supply of electric power from a back-up power source which is disposed within the uninterruptive power supply, a blank line detection part detects a closest blank line yet to be engraved, based on detection of the power failure by a power failure detection part. An engraving machine controller then ensures continued engraving up to the closest blank line and stops engraving. Following this, engraving is resumed after power supply is recovered.

8 Claims, 4 Drawing Sheets

APPARATUS FOR MANUFACTURING PLATE FOR GRAVURE

BACKGROUND OF THE INVENTION

1. Field of the Invention

The present invention relates to an apparatus for manufacturing a photogravure plate for a gravure.

2. Description of the Background Art

During a step of manufacturing a plate for a gravure, an engraving head creates a number of recess portions (cells) which express a gradation on a cylinder, i.e., a plate material, based on gravure data which are monochrome gradation image data. If power failure occurs during this step of manufacturing a plate, an engraving operation for creating cells on the cylinder is stopped. Although the engraving operation may be resumed from the interruption point when power is recovered (hereinafter referred to as "recovery of power"), since a start-up characteristic of the engraving head does not always remain exactly the same, the quality of a plate is deteriorated. In other words, since an operation of the engraving head in the gravure is characterized in that the depth of a cell becomes shallower than a depth which corresponds to gravure data at the starting point and the end point of engraving, once engraving is interrupted because of power failure, engraving after resumed creates cells which are shallower than depths which correspond to the gravure data, and therefore, it is impossible to obtain a gradation exactly according to the gravure data. If this happens, the cylinder which is halfway engraved is conventionally scrapped, so that it is necessary to perform an engraving operation on a new cylinder from the beginning after power is recovered.

Meanwhile, manufacturing of a plate for a gravure takes an enormously long time, and a cylinder which is used as a plate material is expensive. Hence, even if power failure occurs, it is desirable not to waste engraving heretofore completed and to effectively use a cylinder which is halfway engraved. To this end, a plate manufacturing apparatus with an uninterruptive power supply attached thereto may be used. Such a photogravure plate manufacturing apparatus successively performs engraving, using a back-up power source which is installed within an uninterruptive power supply, even if power failure occurs, so that engraving on one cylinder is completed without an interruption. However, since engraving takes an enormously long time (30 minutes to 1 hour, for example, to engrave one cylinder), to complete engraving on one cylinder without any interruption, the back-up power source of the uninterruptive power supply must have a large capacity. Further, even if the back-up power source has a large capacity, if an interval between the current power failure and next power failure after recovery of power is short, since a storage battery which serves as the back-up power source is not charged up sufficiently, interruption of engraving due to the next power failure may be inevitable.

SUMMARY OF THE INVENTION

According to a first aspect of the present invention, there is provided an apparatus for manufacturing a plate for a gravure which moves a plate material in a main scanning direction while moves an engraving head for engraving the plate material in accordance with gravure data in a sub scanning direction with supply of electric power from a commercial power source, so as to manufacture a plate having cells and blank lines which correspond to the gravure data, the main scanning direction being perpendicular to the sub scanning direction. The plate manufacturing apparatus comprises: a) a back-up power source for supplying electric power instead of a commercial power source when power failure occurs in the commercial power source; b) power failure detecting means for detecting the power failure within the commercial power source; c) blank line detecting means for detecting a closest blank line among blank lines which are ahead of the engraving head, the closest blank line being closest to a current position of the engraving head when the power failure is detected; and d) first control means for allowing the engraving head to continue engraving up to the closest blank line and for stopping the engraving head upon detection of the closest blank line.

According to a second aspect of the present invention, there is provided an apparatus for manufacturing a plate for a gravure which operates with supply of electric power from a commercial power source. The plate manufacturing apparatus comprises: engraving means, comprising an engraving head which moves in a sub scanning direction and engraves a plate material in accordance with gravure data, for manufacturing a plate having cells and blank lines which correspond to the gravure data; a back-up power source for supplying electric power to the engraving means; power failure detecting means for detecting that power failure occurs in the commercial power source; blank line detecting means for detecting a closest blank line among blank lines which are ahead of the engraving head, the closest blank line being closest to a current position of the engraving head when the power failure is detected; and first control means for allowing the engraving head to continue engraving up to the closest blank line and for stopping the engraving head upon detection of the closest blank line with supply of electric power from the back-up power source instead of the commercial power source.

Accordingly, an object of the present invention is to provide for a photogravure plate manufacturing apparatus in which even if power failure occurs, engraving is resumed from an interruption point upon recovery of power without deteriorating the quality of a plate for a gravure.

These and other objects, features, aspects and advantages of the present invention will become more apparent from the following detailed description of the present invention when taken in conjunction with the accompanying drawings.

DESCRIPTION OF THE PREFERRED EMBODIMENTS

[Overall Structure According To Preferred Embodiment]

Figure 3:
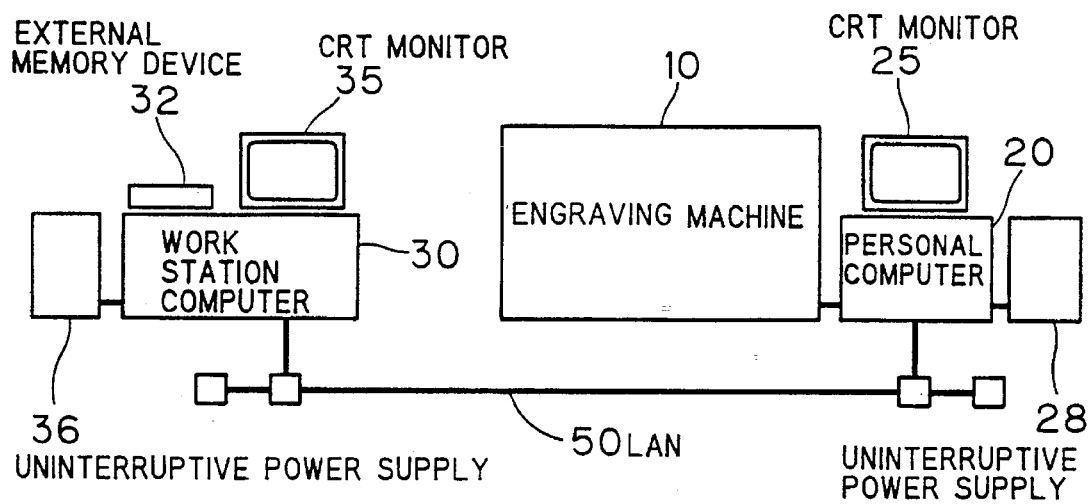
FIG. 3 is a view showing an overall structure of the photogravure plate manufacturing apparatus according to the preferred embodiment.

FIG. 3 is a view showing an overall structure of a photogravure plate manufacturing apparatus according to a preferred embodiment of the present invention. In this photogravure plate manufacturing apparatus, an engraving apparatus which is comprised of an engraving machine 10 and a personal computer system is connected to a work station which serves as an image processing apparatus, in an LAN 50. Uninterruptive power supplies 28 and 36 for supplying power are connected to the engraving apparatus and the work station, respectively.

In such a structure as described above, the work station system is formed by a work station computer 30, an external memory device 32 such as a photo-magnetic disk device, and a CRT monitor 35. The external memory device 32 stores gravure data. The gravure data is combination of monochrome gradation image data which is obtained by predetermined image processing (hereinafter "gravure image data"), information regarding a blank line, i.e., a main scanning line in which no cells are formed (hereinafter "blank line information"), etc. Of the gravure data, the blank line information is transmitted to the engraving apparatus prior to engraving. The gravure image data is transmitted to the engraving apparatus, for each one of scanning lines, in accordance with the progress of engraving.

The personal computer system of the engraving apparatus is formed by a personal computer 20 and a CRT monitor 25. The personal computer system receives the blank line information from the work station on the LAN 50 prior to engraving, and creates data which will be described later (See FIG. 6) within a memory of the personal computer 20 based on the blank line information. In addition, the personal computer system receives gravure image data for each one of the scanning lines from the work station in accordance with the progress of engraving, and controls an operation of the engraving machine 10 to manufacture a plate which corresponds to the gravure image data. In response, the engraving machine 10 allows the engraving head to create a number of recess portions (cells) expressing a gradation on a cylinder, in accordance with the image data, i.e., the monochrome gradation image data.

[Essential Structure]

Figure 1:
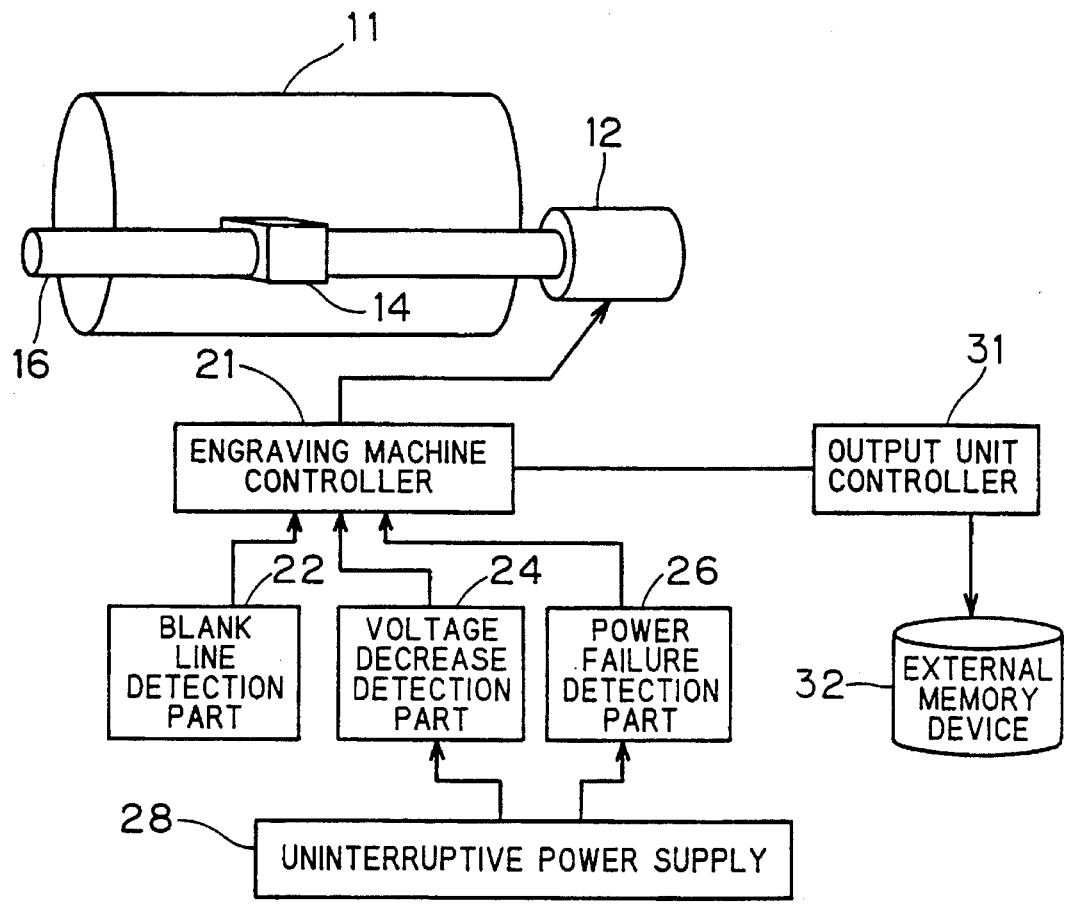
FIG. 1 is a view showing a structure of essential parts of a photogravure plate manufacturing apparatus according to a preferred embodiment of the present invention.

FIG. 1 is a view showing a structure of essential parts of the photogravure plate manufacturing apparatus above, i.e., a structure of portions which are related to an operation for dealing with power failure, mainly, that of a function block. A cylinder 11, a motor 12, a ball screw 16, and an engraving head 14 shown in FIG. 1 form the engraving machine 10 described above. During engraving, the cylinder 11 is rotated in a circumferential direction, i.e., a main scanning direction, by a motor (not shown) while the ball screw 16 is rotated by the motor 12, whereby the engraving head 14 which is engaged with the ball screw 16 moves in the axial direction of the cylinder 11, i.e., in a sub scanning direction. While the cylinder 11 rotates in the main scanning direction and the engraving head 14 rotates in the sub scanning direction, a tip portion of the engraving head 14 reciprocally moves in a direction which is perpendicular to a surface of the cylinder 11, in accordance with the gravure image data. As a result, a number of cells for expressing a gradation are created in the cylinder 11.

An engraving machine controller 21 and a blank line detection part 22 shown in FIG. 1 are realized by the personal computer system which is disposed in the engraving apparatus. The engraving machine controller 21 controls an operation of the engraving machine 10, etc. The blank line detection part 22 detects a blank line which follows and is closest to a current main scanning line, i.e., a scanning line which is being engraved when power failure occurs, of blank lines which are main scanning lines in which no cells are created. (The blank line which is closest to the current main scanning line will be hereinafter referred to as "closest blank line.") In other words, the closest blank line is ahead of and closest to a current position of the engraving head 14 when power failure occurs in the commercial power source. The engraving apparatus also includes a power failure detection part 26 and a voltage decrease detection part 24. The power failure detection part 26 monitors a voltage from a commercial power source which is disposed in the uninterruptive power supply 28 so as to detect power failure. The voltage decrease detection part 24 detects a decrease in the voltage at the back-up power source which is disposed in the uninterruptive power supply 28, after power failure occurs.

On the other hand, an output unit controller 31 is realized by the aforementioned work station system. If a voltage decrease detected by the voltage decrease detection part 24 after power failure occurs exceeds a predetermined tolerable value, from the engraving machine controller 21 on the LAN 50, the output unit controller 31 receives data which is needed to resume engraving at later recovery of power. The output unit controller 31 then stores the data in the external memory device 32.

Figure 2:
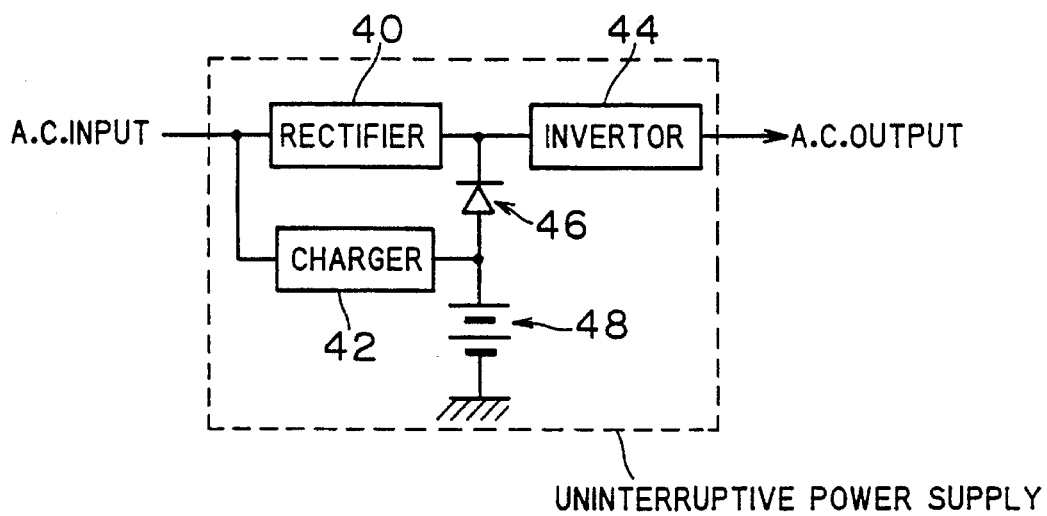
FIG. 2 is a view showing a structure of uninterruptive power supply which is used in the preferred embodiment.

According to the present embodiment, the uninterruptive power supply 28 supplies power to the engraving apparatus which is formed by the engraving machine 10 and the personal computer system, while the uninterruptive power supply 36 supplies power to the work station system which includes the external memory device 32. The uninterruptive power supplies 28 and 36 are each formed by connecting a rectifier 40, a charger 42, an invertor 44, a diode 46, and a storage battery 48 which serves as a back-up power source in a configuration as that shown in FIG. 2. Under a normal condition, the rectifier 40 converts an alternate current input which is available from the commercial power source into a direct current, the invertor 44 then converts the direct current into an alternate current once again, and the alternate current output from the invertor 44 is supplied to the engraving apparatus and the work station system as electric power. Further, under a normal condition, the charger 42 charges up the back-up power source 48, with the alternate current input which is available from the commercial power source. On the other hand, if power failure occurs, the rectifier 40 does not supply electric power to the invertor 44. Instead, a direct current from the back-up power source 48 is supplied to the invertor 44 through the diode 46. The invertor 44 converts this direct current into an alternate current which will be supplied to the engraving apparatus and the work station system as electric power.

[Operation According To Preferred Embodiment]

In the photogravure plate manufacturing apparatus according to the present embodiment, the back-up power sources 48 of the uninterruptive power supplies 28 and 36 start supplying electric power upon power failure, and an engraving operation is stopped after securing such a condition which allows resumption of engraving without deteriorating the quality of a photogravure plate. Now, a detailed description will be given on an operation of the photogravure plate manufacturing apparatus according to the present embodiment, particularly on an operation when power failure has occurred, with reference to the flow chart in FIG. 5.

At Step S10, the engraving machine 10 starts engraving the cylinder 11, under the control of the engraving machine controller 21. Next, at Step 12, the power failure detection part 26 checks whether power failure has occurred, and if there is no power failure detected (i.e., if the condition is normal), engraving is continued without any interruption.

If power failure is detected at Step S12, the sequence proceeds to Step S14 at which the blank line detection part 22 detects the closest one of blank lines which follow (i.e., closest blank line). Now, detection of the closest blank line will be described with reference to FIGS. 6 and 7.

Figure 6:
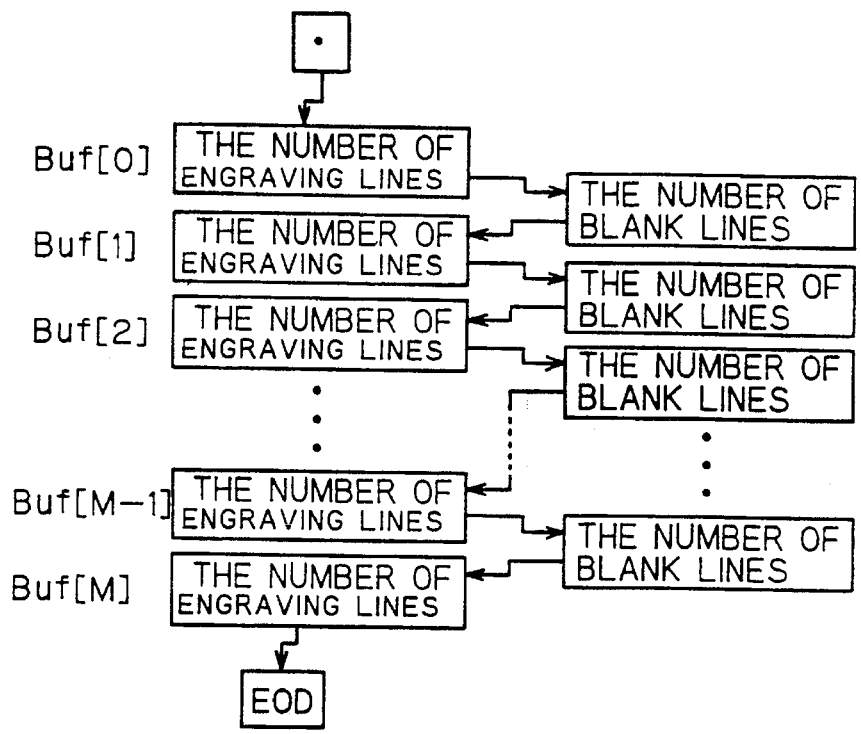
FIG. 6 is a view of data which is used in the preferred embodiment to detect a closest blank line.

The engraving machine controller 21 receives blank line information from the work station system on the LAN 50 prior to engraving, and stores data as that shown in FIG. 6 in a built-in memory in accordance with the blank line information, as described before. In short, the engraving machine controller 21 stores the number of continuous main scanning lines which are to be engraved within an array Buf[i] (i=0, 1, . . . M), in an order from the starting point of engraving toward the end point of engraving. In this case, on a plate which is actually manufactured, as shown by the arrows in FIG. 6, main scanning lines as many as the number which is designated within an element Buf[i] (i=0, 1, . . . M) and blank lines are arranged alternately in the sub scanning direction in a manner as follows: main scanning lines (hereinafter "engraving lines") as many as the number which is designated within an element Buf[0]→a predetermined number of blank lines→engraving lines as many as the number which is designated within an element Buf[1]→ . . . →a predetermined number of blank lines→ engraving lines as many as the number which is designated within an element Buf[M].

Figure 7:
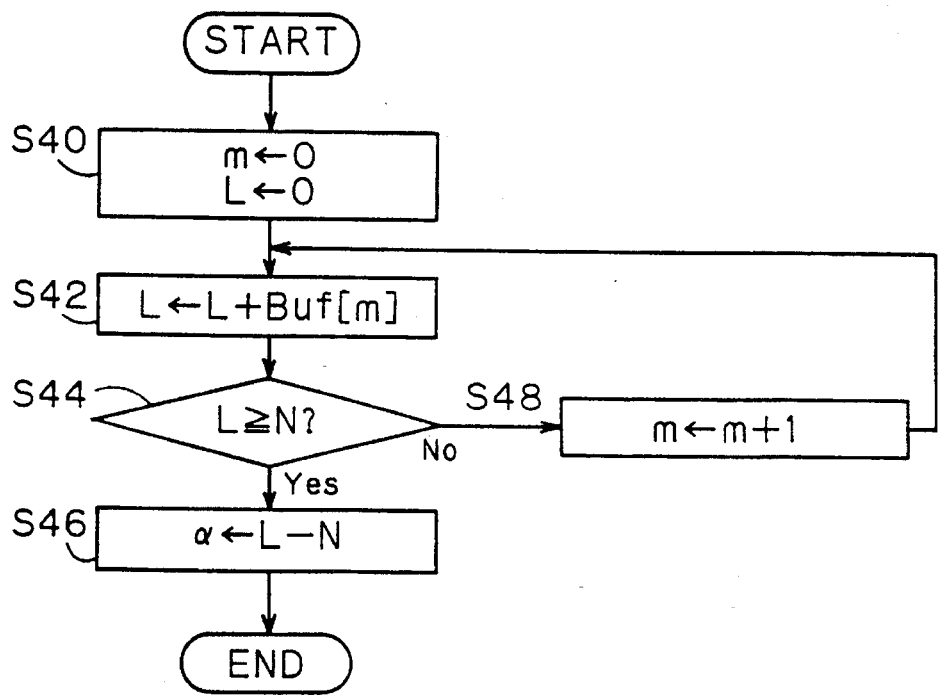
FIG. 7 is a flow chart showing an operation of detecting the closest blank line.

Detection of the closest blank line at Step S14 is performed in a sequence as that shown in the flow chart in FIG. 7.

First, Step S40 is executed to initialize a subscript m for accessing the array Buf and to initialize a variable L, i.e., a variable which is needed to calculate the number of engraving lines from the starting point of engraving up to the closest blank line. That is, m=0 and L=0. Next, at Step S42, Step S44 and Step S48, Buf[i] (i=0, 1, . . . M) is successively added to the variable L. When the sum L reaches the number N of engraving lines which have been already engraved, addition is stopped and the sequence proceeds to Step S46. At Step S46, a difference α between the variable L and the number N of the already engraved lines is calculated, which completes detection of the closest blank line. The figure α calculated in this manner expresses the number of the engraving lines up to the closest blank line.

Figure 5:
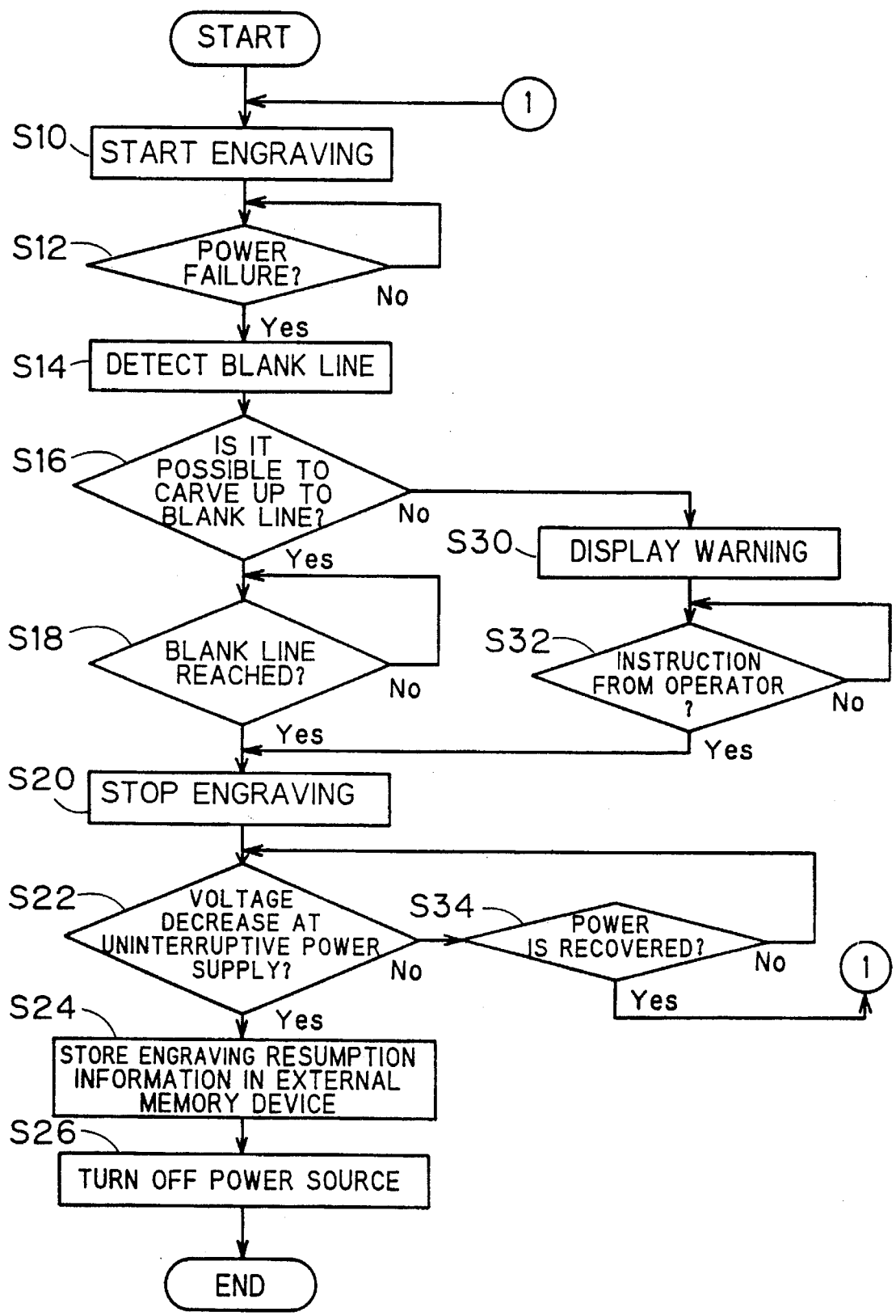
FIG. 5 is a flow chart showing an operation of the photogravure plate manufacturing apparatus according to the preferred embodiment.

Following this, the sequence proceeds to Step S16 which is shown in FIG. 5, at which the engraving machine controller 21 judges whether it is possible to perform engraving up to the closest blank line with power supply from the back-up power sources 48, based on the figure α which is calculated as a result of the detection of the closest blank line. If it is judged that it is possible to perform such engraving, the engraving machine controller 21 allows the engraving head 14 to continuously perform engraving, and stops the engraving head 14 when the engraving head 14 arrives at the closest blank line (Step S18, Step S20). Conversely, if it is judged that it is not possible to perform such engraving, the engraving machine controller 21 displays a warning on the CRT monitor 25 at Step S30. An operator notes the warning and recognizes that it is not possible to perform engraving up to the closest blank line. In this case, the operator instructs to stop the engraving head 14, after waiting the engraving head 14 to arrive at an engraving line which is close to the current engraving point and at which it is proper to stop engraving. The engraving line at which it is proper to stop engraving is preferably such an engraving line which will not make a deterioration in the quality of a plate noticeable even if engraving is resumed at the interruption point on that line after power is recovered. For example, an engraving line which belongs to an area with a white background and a less black portion, such as a line image, is preferable. The engraving machine controller 21 stops engraving in response to such an instruction (Step S20).

After engraving is stopped in the manner described above, at Step S22 and Step S34, the voltage decrease detection part 24 detects a decrease in the voltage at the back-up power source 48 of the uninterruptive power supply 28, and determines whether the decrease in the voltage is larger than the predetermined tolerable value, while waiting for recovery of power. During this waiting period, if power is recovered when the decrease in the voltage is within a tolerable range, the sequence returns to Step S10 so that the engraving machine controller 21 resumes engraving from the interruption point.

If the decrease in the voltage at the back-up power source 48 exceeds the tolerable value during the waiting period, the sequence proceeds to Step S24 at which the engraving machine controller 21 transmits information which is necessary to resume engraving (hereinafter "engraving resumption information ") to the output unit controller 31 on the LAN 50. The output unit controller 31 stores the engraving resumption information within the external memory device 32. As herein referred to, the engraving resumption information is information which expresses the interruption point where engraving is stopped, the name of a file in which the gravure data is stored, an identification number of the engraving machine 10, etc. The information which expresses the interruption point is L=N+α, i.e., a value which is calculated as a result of the detection of the closest blank line shown in FIG. 7, under a normal condition. However, when engraving is stopped in response to an instruction from an operator (See Step S32), the information expressing the interruption point is a value which expresses a main scanning line which corresponds to the instruction. After the engraving resumption information as above is stored in the external memory device 32, the power source of the engraving apparatus is turned off (Step S26).

When the power source is turned on after power is recovered, it is possible to resume engraving from the interruption point, utilizing the engraving resumption information which is stored in the external memory device 32.

In the structure described above, the capacity of the back-up power source of the uninterruptive power supply 36 which is associated with the work station system is large enough to keep the work station system operating at least until the voltage at the back-up power source of the uninterruptive power supply which is associated with the engraving apparatus exceeds the tolerable value (See Step S22).

[Effect of Preferred Embodiment]

Figure 4:
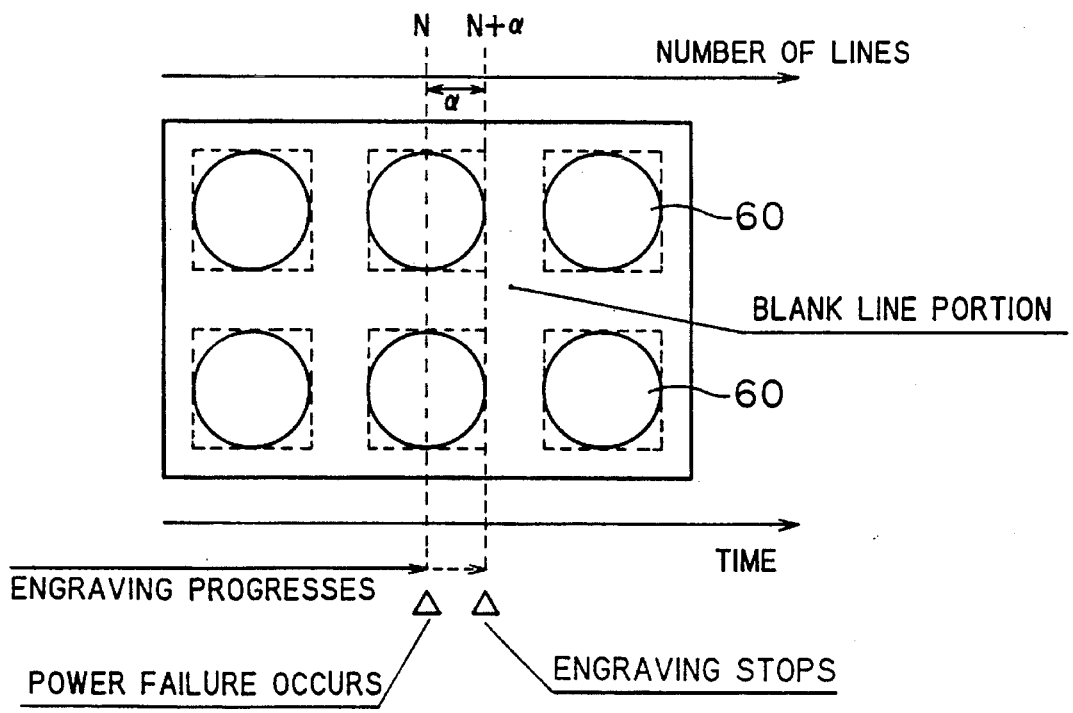
FIG. 4 is a view conceptually showing gravure data which is used in the preferred embodiment.

FIG. 4 is a view conceptually showing the engraving resumption information which is used in the photogravure plate manufacturing apparatus according to the present embodiment. The rectangle defining an outer frame in FIG. 4 corresponds to the entire image which is expressed by the engraving resumption information. A vertical direction is the main scanning direction while a horizontal direction is the sub scanning direction in FIG. 4. Portions enclosed in the circles correspond to areas to be engraved. The engraving machine 10 engraves from the left to the right in FIG. 4. In FIG. 4, main scanning lines which extend straight in the vertical direction but which do not contact any circle are blank lines.

Assuming that engraving is already complete from the first engraving line up to an (N–1)-th line (i.e., main scanning lines to be engraved) and power failure has occurred during engraving on an N-th engraving line, first, the number α of engraving lines up to the closest blank line is calculated (See FIG. 7). It is then judged whether it is possible to perform engraving up to the closest blank line with power supply from the back-up power sources 48. Under a normal condition, engraving is performed to transfer the images of a plurality of original plates which are arranged in the sub scanning direction onto one cylinder, i.e., one plate surface, and edge portions of the respective original plates are blank as margin portions. Hence, the gravure image always includes a blank line. For instance, the gravure image data shown in FIG. 4 includes two blank line portions, since engraving is to be performed to transfer the images of three original plates which are arranged in the sub scanning direction onto one plate surface (That is, there are six original plates in total.). Hence, in this case, the number α of the engraving lines up to the closest blank line is at most about ⅓ of the number of all engraving lines. Thus, since the figure α is normally small fractions of the total number of the engraving lines or smaller than that, even if the back-up power sources 48 does not have a particularly large capacity, the engraving machine 10 can perform engraving which corresponds to the figure α. Hence, normally, an engraving operation is stopped after engraving up to the closest blank line. Therefore, when the engraving machine 10 is activated at recovery of power at a later time, the engraving head 14 passes the blank line portion and then starts engraving at the first engraving line of the next regions 60 to be engraved (i.e., the regions enclosed in the circles in FIG. 4). This solves the conventional problem that resumed engraving from an engraving region deteriorates the quality of a photogravure plate.

[Modification]

In the preferred embodiment described above, in the waiting condition where engraving is stopped after engraving up to the closest blank line, if the voltage at the back-up power source 48 of the uninterruptive power supply 28 decreases, the engraving resumption information is stored in the external memory device 32 (Step S22, Step S24 in FIG. 5). However, if it is less likely to have power failure for a long time, the photogravure plate manufacturing apparatus may just wait for recovery of power, under the waiting condition after engraving is stopped. In this case, the voltage decrease detection part 24 may be omitted, and the processing after power failure occurs can be completed within the engraving apparatus. Further, the external memory device may be connected to the personal computer system of the engraving apparatus, so that the engraving resumption information can be stored in the external memory device if the voltage at the back-up power source 48 decreases under the waiting condition after engraving is stopped. In such a modified structure as well, it is possible to complete the processing after power failure occurs within the engraving apparatus.

While the invention has been described in detail, the foregoing description is in all aspects illustrative and not restrictive. It is understood that numerous other modifications and variations can be devised without departing from the scope of the invention.

We claim:

1. An apparatus for manufacturing a plate for a gravure which moves a plate material in a main scanning direction while moves an engraving head for engraving said plate material in accordance with gravure data in a sub scanning direction with supply of electric power from a commercial power source, so as to manufacture a plate having cells and blank lines which correspond to the gravure data, the main scanning direction being perpendicular to the sub scanning direction, said apparatus comprising:

a) a back-up power source for supplying electric power instead of a commercial power source when power failure occurs in said commercial power source;

b) power failure detecting means for detecting said power failure within said commercial power source;

c) blank line detecting means for detecting a closest blank line among blank lines which are ahead of said engraving head, said closest blank line being closest to a current position of said engraving head when said power failure is detected; and d) first control means for allowing said engraving head to continue engraving up to said closest blank line and for stopping said engraving head upon detection of said closest blank line.

2. The plate manufacturing apparatus of claim 1, further comprising:

voltage decrease detecting means for detecting a decrease in the voltage at said back-up power source;

memory means for storing information which expresses the position of said closest blank line; and second control means for turning off said back-up power source after ensuring that said information is stored in said memory means, when said decrease in the voltage becomes larger than a predetermined tolerable value after engraving is stopped by said first control means.

3. The plate manufacturing apparatus of claim 2, further comprising:

third control means for reading the information stored in said memory means and resuming engraving at recovery of power from said commercial power source on the basis of the information.

4. The plate manufacturing apparatus of claim 1, further comprising:

third control means for directly resuming engraving at recovery of power from said commercial power source.

5. The plate manufacturing apparatus of claim 1, wherein said plate material is in a cylindrical shape and rotated in the main scanning direction.

6. The plate manufacturing apparatus of claim 5, wherein the sub scanning direction is parallel to an axial direction of said cylindrical plate material.

7. An apparatus for manufacturing a plate for a gravure which operates with supply of electric power from a commercial power source, said apparatus comprising:

engraving means, comprising an engraving head which moves in a sub scanning direction and engraves a plate material in accordance with gravure data, for manufacturing a plate having cells and blank lines which correspond to the gravure data;

a back-up power source for supplying electric power to said engraving means;

power failure detecting means for detecting that power failure occurs in said commercial power source;

blank line detecting means for detecting a closest blank line among blank lines which are ahead of said engraving head, said closest blank line being closest to a current position of said engraving head when said power failure is detected; and first control means for allowing said engraving head to continue engraving up to said closest blank line and for stopping said engraving head upon detection of said closest blank line with supply of electric power from said back-up power source instead of said commercial power source.

8. The plate manufacturing apparatus of claim 7, further comprising:

voltage decrease detecting means for detecting a decrease in the voltage at said back-up power source;

memory means for storing information which expresses the position of said closest blank line; and second control means for turning off said back-up power source after ensuring that said information is stored in said memory means, when said decreasein the voltage becomes larger than a predetermined tolerable value after engraving is stopped by said first control means.

* * * * *